United States Patent [19]

Umemoto et al.

[11] Patent Number: 5,552,940
[45] Date of Patent: Sep. 3, 1996

[54] METHOD AND APPARATUS FOR DIGITAL SIGNAL RECORDING AND/OR REPRODUCTION

[75] Inventors: Masuo Umemoto, Hinodemachi; Hirotake Ishii; Hidehiko Sawamura, both of Hachioji; Yoshizumi Eto, Sagamihara, all of Japan

[73] Assignee: Hitachi, Ltd., Tokyo, Japan

[21] Appl. No.: 432,638

[22] Filed: May 3, 1995

Related U.S. Application Data

[63] Continuation of Ser. No. 165,519, Dec. 13, 1993, abandoned, which is a continuation of Ser. No. 771,104, Oct. 4, 1991, abandoned.

[30] Foreign Application Priority Data

Oct. 5, 1990 [JP] Japan .................................. 2-266432

[51] Int. Cl.⁶ ............................... G11B 5/09; H03M 7/46
[52] U.S. Cl. ............................... 360/19.1; 360/32; 341/59
[58] Field of Search .......................... 360/19.1, 32, 33; 358/138, 310, 335; 375/122, 253; 341/58, 59, 64, 61

[56] References Cited

U.S. PATENT DOCUMENTS

| | | | |
|---|---|---|---|
| 4,468,710 | 8/1984 | Hashimoto et al. | 360/33.1 |
| 4,477,844 | 10/1984 | Nakano et al. | 360/32 |
| 4,490,753 | 12/1984 | Ito et al. | 360/19.1 |
| 4,501,000 | 2/1985 | Immink et al. | 341/58 |
| 4,527,202 | 7/1985 | Ohta | 360/19.1 |
| 4,563,710 | 1/1986 | Baldwin | 360/19.1 |
| 4,670,796 | 6/1987 | Kabayashi et al. | 360/19.1 |
| 4,812,930 | 3/1989 | Sakata . | |
| 4,833,470 | 5/1989 | Iketani | 341/58 |
| 4,989,102 | 1/1991 | Murabayashi et al. | 360/27 |

FOREIGN PATENT DOCUMENTS 63-261576 10/1988 Japan .

OTHER PUBLICATIONS

"HDTV Digital VTR", Laurence Thorpe et al., SMPT Journal, Oct. 1989, pp. 738–474.

*Primary Examiner*—Edward P. Westin
*Assistant Examiner*—Benjamin D. Driscoll
*Attorney, Agent, or Firm*—Antonelli, Terry, Stout & Kraus

[57] ABSTRACT

A method and an apparatus for digital signal recording and/or reproduction are disclosed in which tracks are formed sequentially on a recording medium by use of a head unit mounted on a rotary cylinder, an input digital data is recorded in the recording medium, and the digital data thus recorded is reproduced. The input digital data is modulated into a code word having at least d (d: an integer of at least two) successive bits of high- and low-level data in a signal waveform recorded in the recording medium. The timebase of the code word is compressed. The compressed code word is recorded in the tracks of the recording medium by use of the head unit. The code word recorded and compressed in the recording medium is reproduced. The timebase of the reproduced code word is expanded, and the input digital data is reproduced from the expanded code word.

36 Claims, 8 Drawing Sheets

$T_D$ ···· BIT INTERVAL OF 8-BIT DATA $T_M$ ···· BIT INTERVAL OF 12-BIT DATA

METHOD AND APPARATUS FOR DIGITAL SIGNAL RECORDING AND/OR REPRODUCTION

This application is a continuation of Ser. No. 08/165,519, now abandoned, which is continuation of Ser. No. 07/771, 104, now abandoned, filed Dec. 13, 1993 and Oct. 4, 1991.

BACKGROUND OF THE INVENTION

The present invention relates to a method and an apparatus for recording and/or reproducing digital signals, in particular to a method and an apparatus for recording digital signals in a recording medium by heads mounted on a rotary cylinder.

A conventional digital signal recording and reproduction apparatus is well known for recording and/or reproducing a high-definition television signal. An example of such an apparatus is disclosed in "HDTV Digital VTR", by Laurence Thorpe et al, SMPT Journal, October, 1989, pp. 738 to 747. This apparatus comprises eight recording heads and eight reproduction heads used for recording and reproducing digitized high-definition television signals of 1.2 Gb/s on a magnetic tape having a width of one inch. The drive system of the recording tape is reconstructed from a helical scanning type of VTR called the "C format" and has a recording tape winding angle of 345 degree proximate to 360 degree. As a result, a television signal is capable of being recorded except for the portions equivalent to the vertical blanking period.

As seen from this example, the recording and reproduction heads are required to be set to an optimized head parameter and cannot be used for recording and reproduction at the same time for a recording wavelength of 1.0 μm or less. In the digital VTR of high-definition television signal requiring multichannel recording, therefore, a number of recording and reproduction heads are required on a rotary cylinder, thereby posing a significant problem for system configuration. This problem has been addressed only by increasing the cylinder diameter.

SUMMARY OF THE INVENTION

An increased cylinder diameter and an increased winding angle lead to such disadvantages such as an enlarged size of the apparatus, an increased track length (length of magnetic tape for enabling a recording head to make recording per cylinder revolution), difficulty in interchangeable reproduction between apparatuses of the same model, a narrower track pitch (track interval) and an increased amount of tape consumption.

However, it is not very easy to reduce the cylinder diameter, on the other hand, because the relative recording speed would then be reduced for a shorter recording wavelength.

When the winding angle is reduced to, say, 180° in the above-described configuration, a recording head for the last half revolution is of course required in addition to the eight recording heads for the first half revolution. A total of 32 heads including the reproduction heads is required, thereby posing the practical problems of head yield, securing contact of each head with the tape and mounting the heads.

A conventional method has been suggested in which a recording signal corresponding to one track length is stored in a memory, the rate of reading from the memory is increased to compress the timebase of the signal, and the winding angle is reduced while keeping the same number of heads. In this case, however, the compression of signal timebase and the resulting data speed naturally shortens the recording wavelength.

As explained above, in the prior art, it is necessary to overcome contradictory conditions that a decreased winding angle of the recording tape increases the number of heads, and the winding angle of tape must be increased in order to reduce the number of heads. A compressed timebase, on the other hand, reduces the number of heads but shortens the recording wavelength.

An object of the present invention is to provide a method and an apparatus for recording and/or reproducing digital signals which obviate the disadvantages of the prior art.

Another object of the present invention is to provide a method and an apparatus for recording and/or reproducing digital signals in which the winding angle is reduced while keeping the same number of heads for the winding angle of 360 degrees.

Still another object of the present invention is to provide a method and an apparatus for recording and/or reproducing digital signals, simplified in circuit configuration in such a manner that a digital signal recorded in a recording medium is completed for each data block.

A further object of the present invention is to provide a method and an apparatus for recording and/or reproducing digital signals, in which the erasing heads may be reduced in number when an audio signal and a video signal are recorded as digital signals in the same track.

In order to achieve these objects of the invention, according to an aspect of the invention, there is provided a digital signal recording apparatus for recording digital data in a recording medium by forming tracks sequentially on the recording medium by use of a head unit mounted on a rotary cylinder, comprising a code modulation unit for modulating a digital data into a code word formed of a high-level data and low-level data of d (d: an integer of 2 or more) or more successive bits in a signal waveform recorded in the recording medium, a compression unit for compressing and producing the timebase of a code word, and a unit for recording the output of the compression unit in the tracks of the recording medium by the head unit.

According to another aspect of the present invention, there is provided a digital signal reproduction apparatus for reproducing digital data recorded in a recording medium by forming tracks sequentially in the recording medium by use of a head unit mounted on a rotary cylinder, comprised of a reproduction unit for reproducing a code word including a number d or more (d: an integer of 2 or more) of successive bits of high-level and low-level data in a signal waveform recorded in a recording medium in the form compressed along the timebase, an expansion unit for expanding the timebase of the code word reproduced by the reproduction unit, and a modulation unit for converting an expanded code word into a digital data.

In this way, according to the present invention, the timebase is compressed by a compression unit, and therefore the winding angle on the cylinder of the recording medium can be reduced. Also, since the timebase is compressed after modulating a digital data into a code word of d or more continuous bits, the recording wavelength is kept prevented from being shortened. (This hold true also when modulation is effected after timebase compression.)

In a digital signal recording apparatus according to an example of the invention, a code modulation unit modulates a digital data configured of n bits as a unit (n: an integer of 1 or more) into a code word of successive m bits as a unit (m: an integer of 1 or more) having a high- or low-level data of at least d bits (d: an integer of two or more).

Also, a compression unit is for compressing the time base of m bits of code word at a compression rate of a (a<1).

As a result, the winding angle of the recording tape on the rotary cylinder can be reduced from about 360° to 360°×a without changing the number of heads.

According to an example of the invention, the compression rate a is set to satisfy the equation shown below.

$$m/nd \leq a < 1 \qquad (1)$$

If the numerical values are set to satisfy Equation (1) by use of the operation for converting a code word of n bits to a code word of m bits (m>n) including at least d bits of "1" and "0" and the operation for compressing the timebase of data transfer (the compression rate is given as a) before recording of m bits of code word, then the winding angle of the recording tape on the cylinder can be reduced without shortening the recording wavelength.

In a preferable example, n=8, m=12, and d=2. In this case, a code conversion (modulation) unit called the eight-to-twelve modulation is employed while at the same time reducing the timebase to a compression rate of a (⅔≦a<1). The eight-to-twelve modulation is a system for converting an eight-bit data to a 12-bit data. This increases the data rate by 3/2 (=12/8). Assuming that the data "1" is recorded as high-level data and the data "0" as low-level data, however, two or more data are always presented in successive form after modulation. The shortest recording wavelength under timebase compression at the compression rate of a is larger by the amount shown in the equation below than when eight-bit data is recorded directly for 360°.

$$a \times \frac{2 \times 2}{3} = \frac{4}{3} a$$

If ⅔≦a<1, the recording wavelength is not shortened and the winding angle can be reduced by 360°×a.

In the eight-to-twelve modulation, the eight-bit data ($2^8$= 256) is divided into four groups. In group A, a 12-bit modulation code is determined only by the present eight-bit data. In group B, the 12-bit modulation code is determined in dependency on the present 8-bit data and the last bit of the immediately-preceding modulation code. In group C, the 12-bit modulation code is determined in dependency on the present 8-bit data and the head bit of the immediately-following modulation code. In group D, the 12-bit modulation code is determined in dependency on the last bit of the immediately-preceding modulation code and the head bit of the immediately-following modulation code. As a result, in groups B, C and D, two types of 12-bit modulation code are prepared for B and four types for C against the related eight-bit data.

According to an example, with regard to a sync code forming the head of a block data, an n-to-m (e.g., eight-to-twelve) modulation code that can be allotted without depending on the data immediately preceding to the sync code is used. A sync code is inserted in the head of a data block with a plurality of pixel data as one definite portion. A word sync of a reproduction clock is set on the basis of this sync code. At least the head word (n (8) bits) of a sync code made up of a plurality of data words (n (8) bits×l, where l is a positive integer) is selected from the group A. As a result, the same modulation code is always selected for at least the head of a sync code without regard to the immediately preceding modulation code, and therefore, only one type of coincidence circuit serves the purpose for detecting a modulation code corresponding to the sync code from the reproduction data train, thereby simplifying the circuit and stabilizing the operation.

According to an example, the erasing head has a track width large enough to erase a plurality of tracks at the same time. In the case where a television signal is used as an input digital signal, a video signal together with an audio signal are recorded by a plurality of recording heads forming a plurality of video tracks. When a video signal data is erased, a plurality of tracks are erased at the same time, and therefore the erasing track covers a plurality of tracks. The number of tracks is thus reduced greatly as compared with when an erasing head is provided for each track. Accordingly, the same channel signal is recorded in a plurality of tracks at the same time for an audio signal data. Even when a dropout occurs in a track, the data of another track may replace it, thereby providing a highly reliable audio system.

DESCRIPTION OF THE PREFERRED EMBODIMENTS

An embodiment of a method and an apparatus for digital signal recording and/or reproduction according to the present invention will be explained below with reference to the accompanying drawings.

Figure 1:
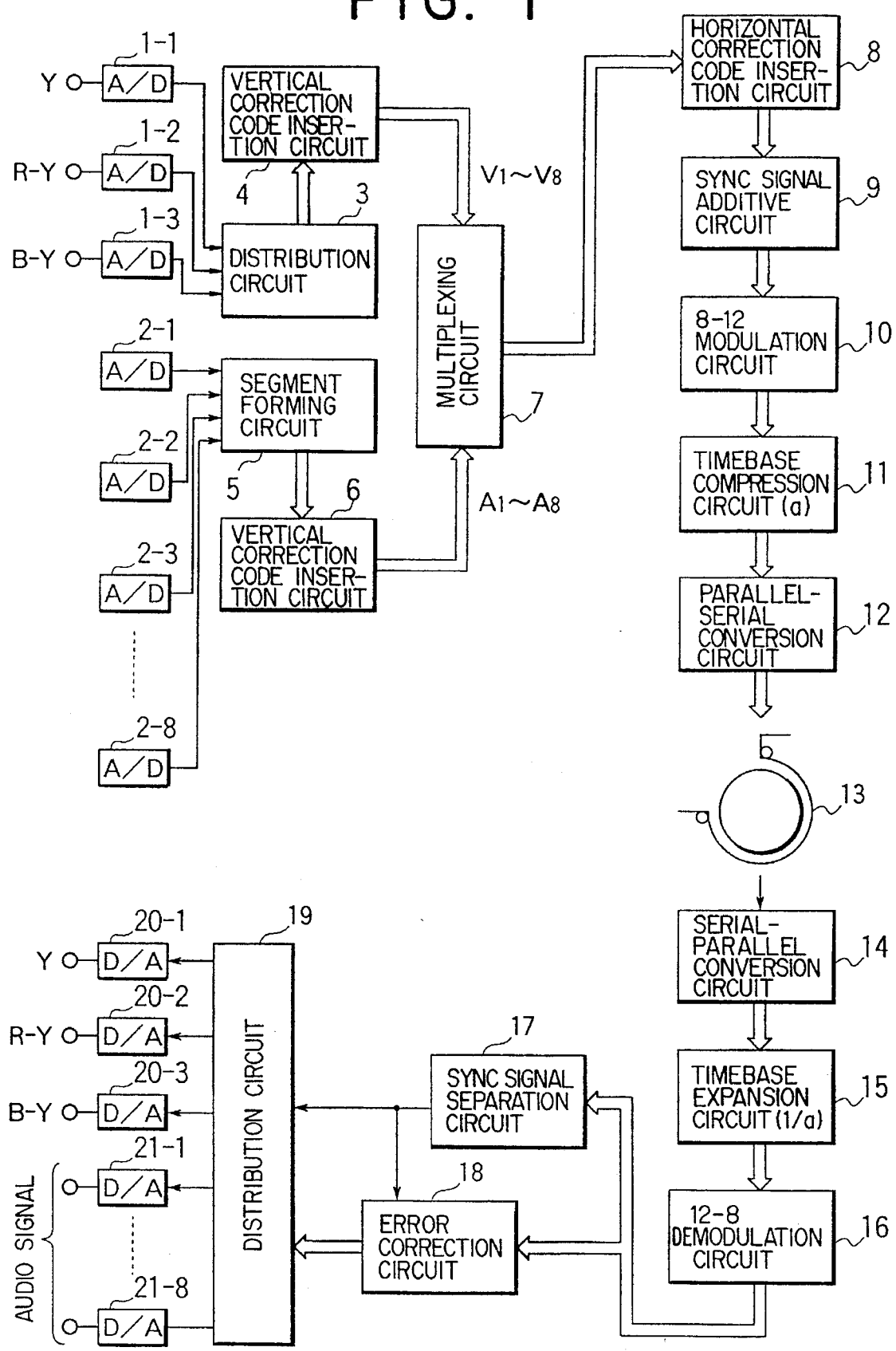
FIG. 1 is a block diagram showing a configuration of an example of the recording and reproduction apparatus of digital signals according to the present invention.

FIG. 1 is a block diagram showing an embodiment of the present invention as applied to a recording and/or reproduction apparatus of a television signal such as high-definition television signal.

In FIG. 1, a video signal of television signal is converted to a digital signal by analog-to-digital (A/D) converters 1-1, 1-2 and 1-3. The television signal according to the present embodiment has 1125 scanning lines, a field frequency of 60

Hz, a bandwidth 30 MHz of the luminance signal Y, and a bandwidth 15 MHz of two color difference signals R-Y and B-Y. As a result, the luminance signal Y is sampled at the sampling frequency of, say, 74.25 MHz and the two color-difference signals R-Y and B-Y at the sampling frequency of, say, 37.125 MHz by the A/D converters 1-1 to 1-3. All three signals are quantized by, for example, eight bits, and after being multiplexed and mixed, are distributed to eight channels by a distribution circuit 3 in accordance with the number (for example, eight) of the recording heads. Such data as the horizontal blanking period and vertical blanking period are excluded from the distribution, which is effected in units of two pixels (two words) adjacent on the screen. An error correction code is inserted in two stages. First, a vertical error correction code (outer code) is inserted for each channel by a vertical correction code insertion circuit 4, and output as video data $V_1$ to $V_8$.

On the other hand, audio signals are prepared for eight channels. These signals are sampled at a sampling frequency of, say, 48 kHz by the A/D converters 2-1 to 2-8 respectively and quantized in 20 bits for each sample. The quantized audio signals of eight channels are configured as data arranged in one-half field period at a segment forming circuit 5 in order to multiplex them with a video signal data of the television signal. After that, a vertical correction code is inserted by an audio signal vertical correction code insertion circuit 6 and is output as audio data $A_1$ to $A_8$.

Figure 2:
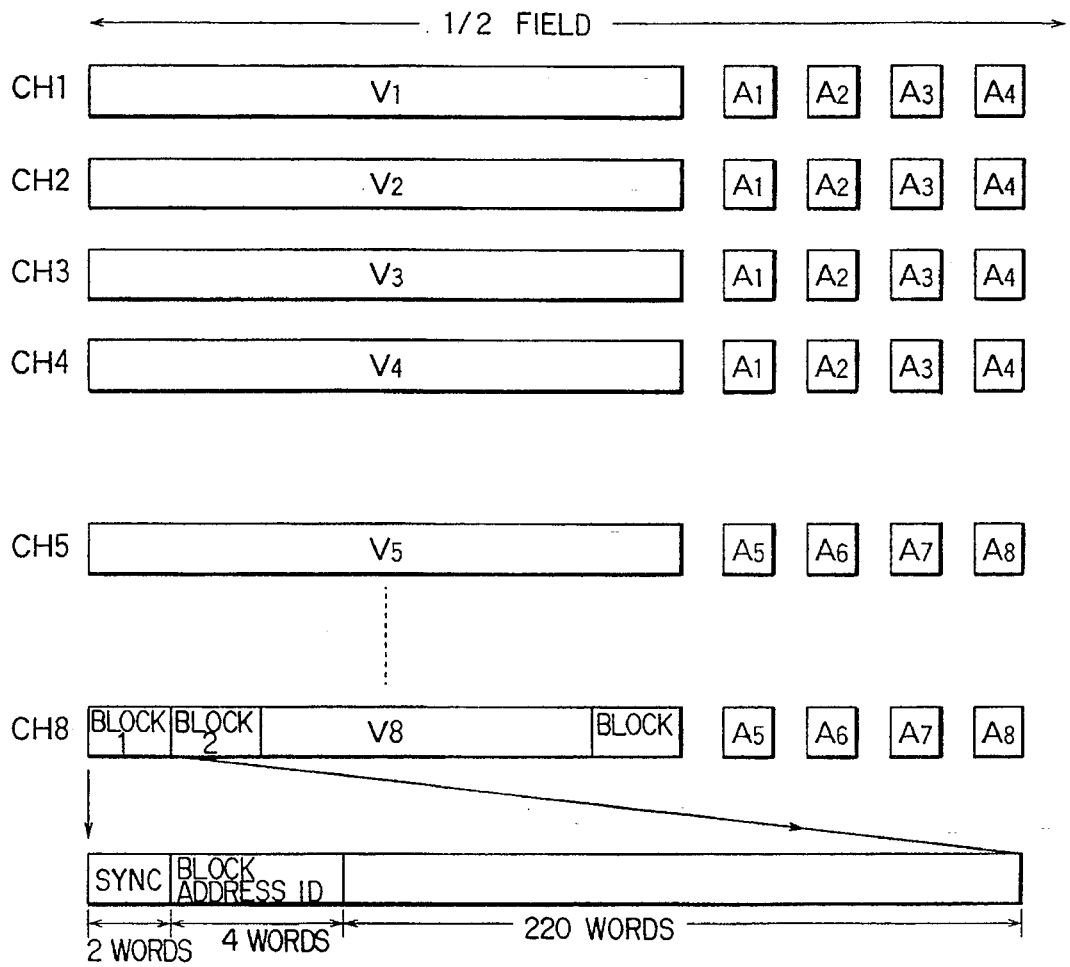
FIG. 2 is a diagram showing an example of signal configuration of each channel of a one-half field period in the recording system of a digital signal recording and reproduction apparatus shown in FIG. 1.

The multiplexing circuit 7 multiplexes the video data $V_1$ to $V_8$ with the audio data $A_1$ to $A_8$ at each channel as shown in FIG. 2. The video data are thus multiplexed with the audio data in a one-half field period.

The inner one of a horizontal correction code is computed and inserted in the multiplexed data by a horizontal correction code insertion circuit 8. Specifically, a six-word horizontal correction code is inserted against a 104-word data. Further, with two 110-word data as a unit making up a 220-word block, a plurality of, say, two words are added to the head thereof and a plurality of, say, four words as an address data showing the block position, are added at a sync signal additive circuit 9. The eight-bit data is converted to a 12-bit data for each word by an n-to-m (for example, eight-to-twelve) modulation circuit 10.

The basic characteristics of the code signal subjected to the eight-to-twelve modulation are such that a code data of serial type after modulation is always formed of two or more successive pulses of the same polarity.

Figure 3:
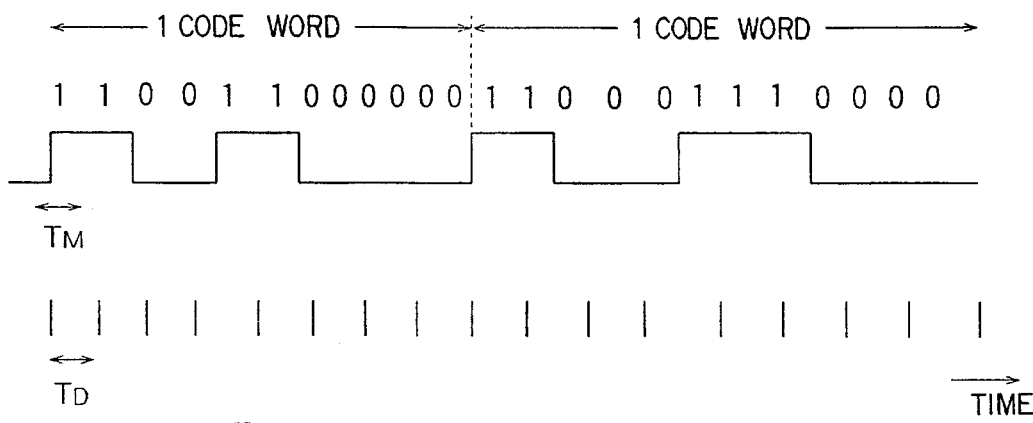
FIG. 3 is a diagram showing an example of the 12-bit code data and a waveform thereof used for the eight-to-twelve modulation.

An example of the 12-bit code data used for eight-to-twelve modulation and a nonreturn-to-zero (NRZ) signal waveform in serial form of the data are shown in FIG. 3. Now, an NRZI signal may be recorded instead of an NRZL signal.

The 12-bit code data used for eight-to-twelve modulation will be explained. The eight-to-twelve modulation and the n-to-m modulation system ($n \geq 3$, $m \geq 5$) applicable according to the present invention are disclosed in JP-A-63-261576 laid opened on Oct. 28, 1988 entitled "Method of modulating digital signal", which disclosure is incorporated herein by reference.

In the n-to-m modulation system ($n \geq 3$, $m \geq 5$) according to the present invention, a modulation rule is established in such a manner that the minimum length between transitions is two bits including the connecting points between the channel codes (code words) for lengthening the recording wavelength. For this purpose, the codes included in the four groups described below of the m-bit codes are used as channel codes. A method of securing the minimum length between transitions at the connecting points will be explained with reference to FIG. 4.

Assume that data $n_1$, $n_2$ and $n_3$ are received in that order sequentially along an arrow 41 for each n bits. Channel codes (code word) $m_1$, $m_2$, $m_3$ are arranged to correspond to each n bits including $n_1$, $n_2$, $n_3$.

The $m_{a2}$ bit code of group A is determined uniquely without regard to the preceding or following (succeeding) channel codes, and makes up such a code as to have two bits of minimum interval (time) between transitions. For the subsequent groups including B, in contrast, a plurality of channel codes are prepared in order to secure two bits as a minimum length (time) between transitions at the connecting points between channel codes (code words).

The bit codes $m_b$ in group B are such that two types of channel codes $m_{b2}$ and $m_{b2}$ with the first bit of 1 or 0 are switched in accordance with 1 or 0 of the last bit of the preceding channel code and the minimum interval (time) between transitions is two bits.

The bit codes $m_c$ in group C are such that two types of channel codes $m_{c2}$ and $m_{c2}$ with the last bit of 1 or 0 in accordance with the first bit 1 or 0 of the following channel code are switched and the minimum interval (time) between transitions is two bits. In this case, the head bit of $m_{c2}$ and $m'_{c2}$ are the same.

The bit codes $m_d$ in group D are such that $m_{d2}$, $m'_{d2}$ with the first bit of 1 and the last of 1.0 and $m''_{d2}$, $m'''_{d2}$ with the first bit of 0 and the last bit of 1.0 are switched in accordance with the last bit 1 or 0 of the preceding channel code and the first bit 1 or 0 of the following channel code, and the minimum interval (time) of transitions at the connecting points is two bits or more. In this case, $m_{d2}$, $m'_{d*}$ and $m''_{d2\#}$, $m'''_{d2\#}$ switched in the following channel code have the same head bit.

In the eight-to-twelve modulation, therefore, the eight-bit data ($2^8=256$) is divided into four types. In group A, a 12-bit modulation code is determined dependent only upon the particular 8-bit data; group B, dependent upon the particular eight-bit data and the last bit of the immediately preceding modulation code; group C, dependent upon the particular eight-bit data and the first bit of the immediately following modulation code; and group D, in dependent upon the particular eight-bit data, the last bit of the immediately preceding modulation code and the first bit of the immediately following modulation code. As a result, two types of 12-bit modulation code are prepared for groups B and C, and four types of 12-bit modulation code for group D against the particular eight-bit data.

Figure 4:
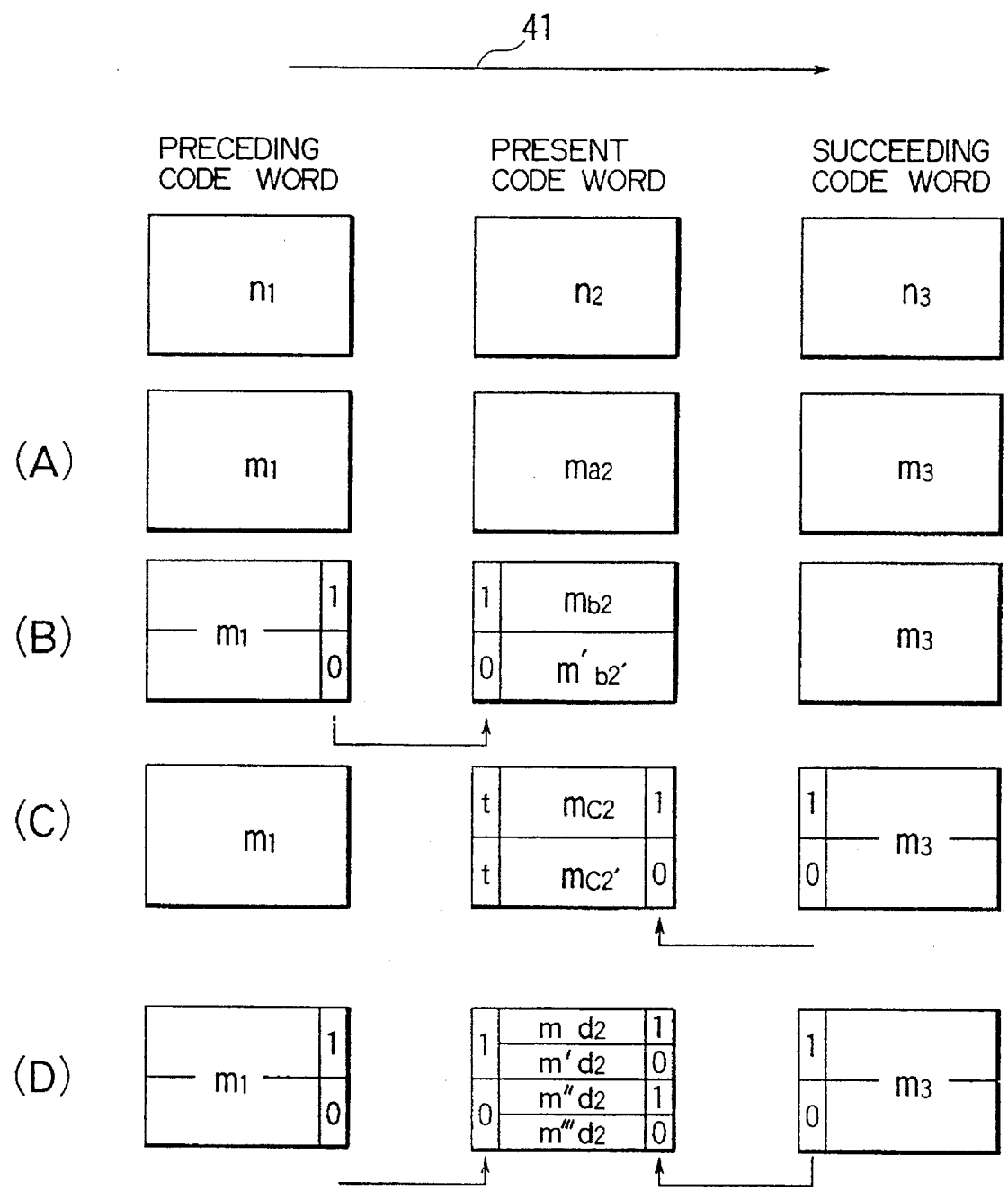
FIG. 4 is a diagram for explaining an n-to-m modulation system applicable according to the present invention.

As shown in FIG. 4, when a channel code is selected taking into consideration the value of the last or first bit of the preceding or following channel code, the minimum interval (time) between transitions including the connecting points of channel codes can be made two bits or more.

In group C, a tentative channel code is determined and the channel codes $m_{c2}$ and $m'_{c2}$ are switched in accordance with the value of the first bit of the following channel code. Since the same first bit is selected for $m_{c2}$ and $m'_{c2}$, however the $m_1$ channel code is not affected, and therefore the preceding channel codes are not required to be changed. This corresponds to the fact that an error is not propagated. It is, of course, possible to convert an m-bit channel code uniquely to an n-bit data at the time of decoding for reproduction.

Figure 5:
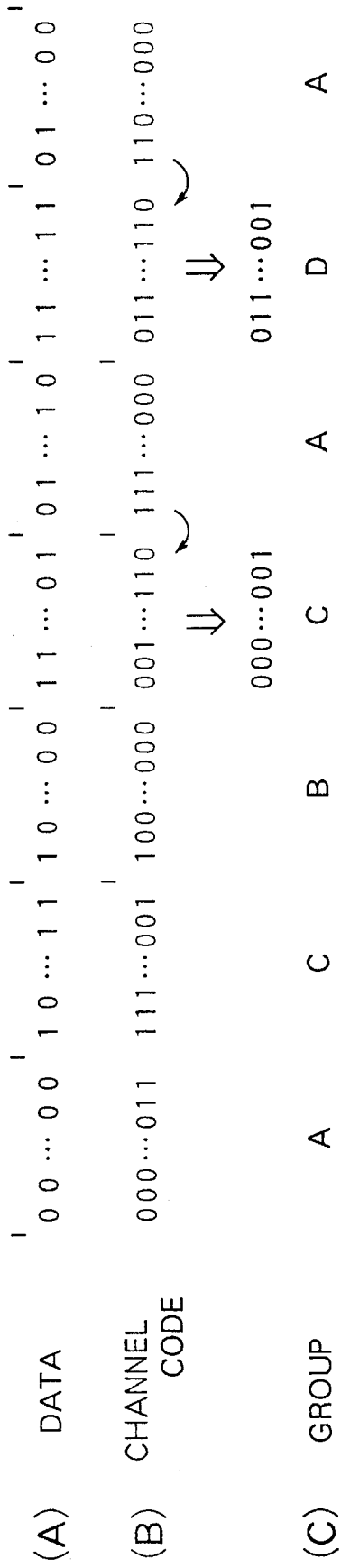
FIG. 5 is a diagram showing an example of the code data subjected to the eight-to-twelve modulation.

The eight-to-twelve modulation is used as described above according to the present embodiment. An example of the input data train (code word) and a converted channel code (code word) are shown in FIG. 5. Input data groups are also shown for facilitating the understanding thereof.

Of all the input data, 10--11, 11--01 and 11-11, belonging to groups C and D respectively, are converted to tentative channel codes 111--001, 001--110 and 011--110 respectively. The channel code 10--00 for group B, on the other hand, is set uniquely to 100-000 corresponding to the last bit of the immediately preceding channel code.

The tentative channel codes of groups C and D are divided into those reconverted codes and not changed any more in accordance with the first value of the following channel code. Specifically, 111--001 is left unchanged, while 001--110 is reconverted to 000--001, and 011--110 to 011--001.

It was explained above that in the case where group B follows group C, a channel code is allotted to group B in accordance with the tentative channel code already determined for group C. As a result, since the code of the group C is determined depending on the succeeding code the influence due the preceding code due to the change in the code of group C is automatically eliminated.

In this way, in the eight-to-twelve modulation, an eight-bit input code data and a code data satisfying the condition that two or more successive pulses of the same polarity make up data including the connections of code data in accordance with the immediately-preceding and immediately-following 12-bit code data are prepared from among the $2^{12}$ combinations of 12-bit data. In FIG. 3, assuming that the bit data interval of eight-bit data is $T_D$, the bit data interval after eight-to-twelve modulation $T_M$ is shortened to $8/12 T_D$. In view of the fact that at least two pulses of the same polarity occur in the minimum length between transitions Tmin of the recording waveform after modulation, however, Tmin= $4/3 T_D$ is established, indicating that the data bit interval $T_M$ after modulation is wider than the bit interval of the original eight-bit data.

Figure 6:
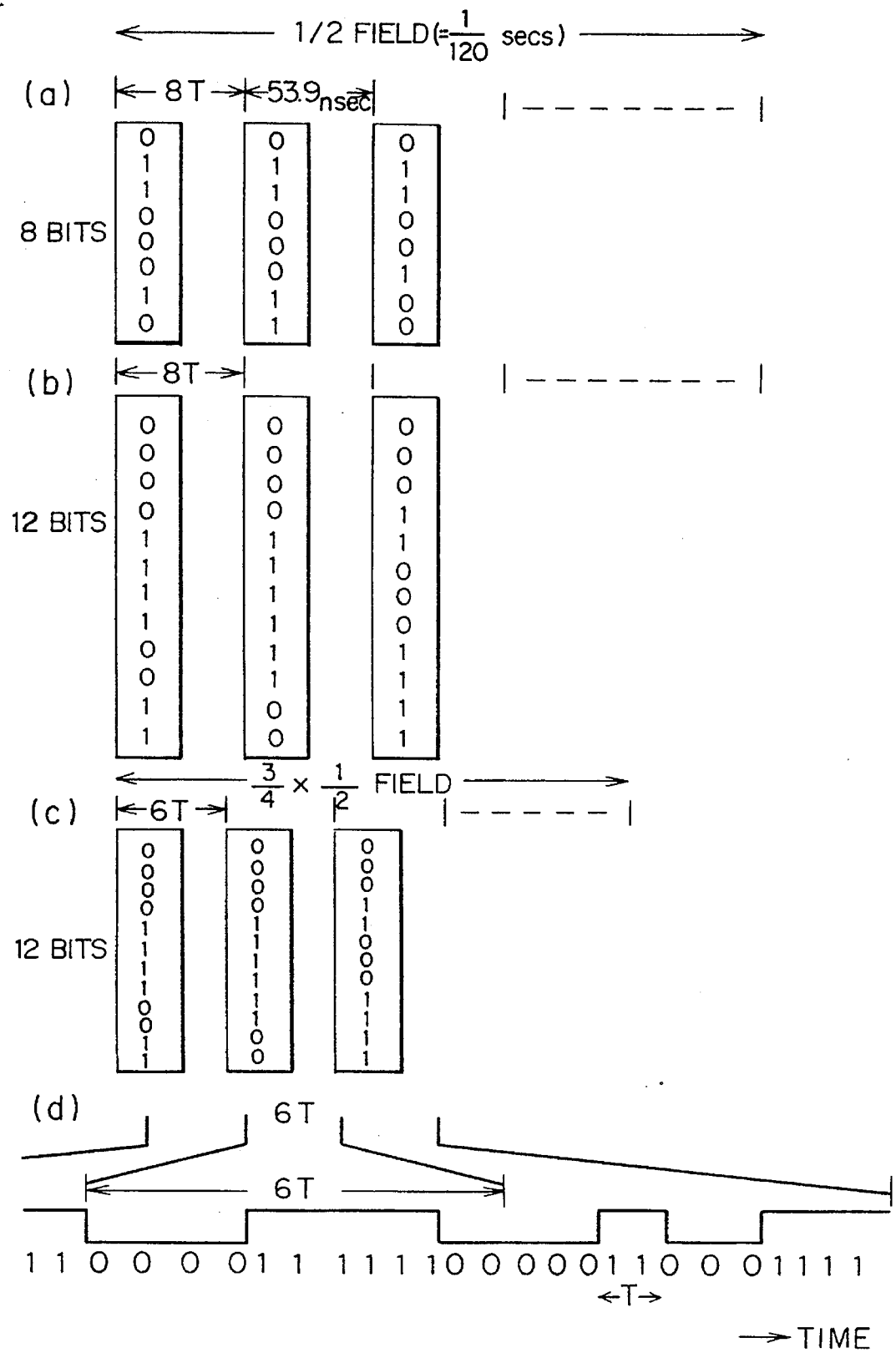
FIG. 6 is a diagram showing a signal during the one-half field period of each part of the recording system according to an example shown in FIG. 1.

A flow of signals at each part in FIG. 1 using the above-mentioned eight-to-twelve modulation and the timebase compression at the same time is shown in FIG. 6, with reference to which explanation will be made more in detail.

The data to be recorded for each revolution (e.g., 1/120 secs) of the rotary cylinder is such that as shown in FIG. 4A, each word assumed to be comprised of eight bits is output from the sync additive circuit 9 in a period of 8T (T: Period of bit rate and $$\frac{1}{148.5 \times 10^6}$$

secs). Each word is converted into a 12-bit code data by the eight-to-twelve modulation circuit 10 as shown in FIG. 4B.

In the eight-to-twelve modulation circuit 10, the head word of the sync signal is selected from the 12-bit data of group A of all the 12-bit codes. Specifically, assuming that the eight-bit head word of the sync signal is "00110000" for instance, this is converted into a 12-bit word of "000011100011" as an example. The sync signal after eight-to-twelve modulation is comprised of two words by employing "100011001111", for example, after the data of the head word.

In this way, the eight-to-twelve modulation circuit selects the 12-bit code data of group A as the head word of the sync signal. In spite of this, the second word of the sync signal and the other words in a block of a block address data, etc., may be selected as a 12-bit code data of any of groups A to D.

As a result, at least the head word of a sync signal is always selected as the same modulation code regardless of the immediately-preceding modulation code. Therefore, only one type of coincidence circuit will do for detecting a modulation code corresponding to the sync signal in the twelve-to-eight modulation circuit 16 of the reproduction system from a reproduction data train, thereby realizing a simplification and stable operation of the circuit.

The data converted into a 12-bit code data is applied to the time compression circuit 11 of the time compression rate a where a signal component of ½ field (1/120 secs) is further stored in an internal memory tentatively. This signal component is read out at a high-speed clock rate of, say, 6T and thereby is compressed to ¾ in timebase. This process is shown in (c) of FIG. 6C. A parallel-to-serial conversion circuit 12 converts a 12-bit parallel data into a serial data so that the data compressed in timebase may be recorded in the tape of the tape head system 13. A recording waveform with an enlarged data interval 6T is shown in simple form in (d) of FIG. 6. As seen from (d) of FIG. 6, the minimum duration of the same polarity of the recording waveform, i.e., the minimum length between transitions is given as T.

In the timebase compression circuit 11, the timing of starting to write is required to be synchronous with the timing of starting to read. In view of the fact that the write clock is not required to be synchronous with the read clock, however, it is possible to use a high-speed clock generated in the vicinity of the timebase compression circuit 11 without applying a read high-speed clock to the master clock of the apparatus.

The tape head system and the peripheral circuits (mainly, the high-speed signal processing section) handle a minor signal, and therefore are often configured separately from the other digital signal processing sections. It is technically difficult and uneconomical to send a high-speed clock. The present apparatus in which a high-speed clock of the timebase compression circuit 11 is not required to be sent from the master clock as described above has a very great practical advantage.

In the aforementioned embodiment, an eight-bit data is converted to a 12-bit data, and therefore the data rate is increased by 3/2 (=12/8). The data after conversion, however, has always two or more successive units on the assumption that the data "1" is recorded as high level and the data "0" as low level. As compared with when eight-bit data is recorded directly with 360° the minimum recording wavelength under timebase compression at the compression rate a is increased by the amount shown by the equation below.

$$a \times \frac{2 \times 2}{3} = \frac{4}{3} a$$

If the range of a is given as ¾ a<1, the recording wavelength is not shortened, and the winding angle is reduced by 360°×a.

As a result, if a<1, the winding angle can be reduced by 360×a.

Figure 7:
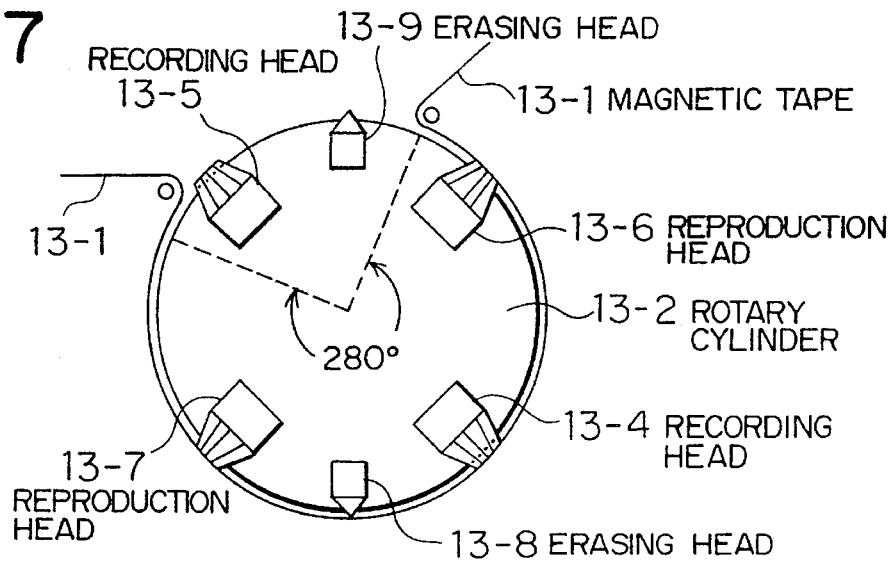
FIG. 7 is a diagram showing an example of the tape head system in FIG. 1.

FIG. 7 shows an example of the tape head system 13. A magnetic tape 13-1 is wound by 280°, for example, on a rotary cylinder 13-2. Taking into consideration the insufficient contact between heads and the tape at the beginning and end portions of the winding, tape is wrapped around the cylinder over an angular extent of substantially 280°, for example.

The rotary cylinder 13-2 has, for example, two sets of recording heads 13-4, 13-5 each set having, for example, four recording heads mounted by 180° in opposed relation to each other, and has, for example, two sets of reproduction heads 13-6, 13-7 each set having, for example, four reproduction heads. There are also mounted erasing heads 13-8, 13-9 each having a track width sufficient to erase recording tracks associated with four heads positioned preceding to the recording heads 13-4, 13-5.

Figure 8:
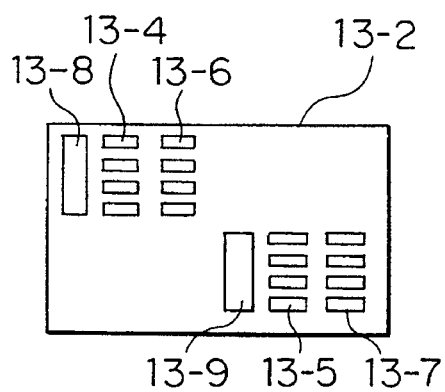
FIG. 8 is a diagram showing a head arrangement of a tape head system shown in FIG. 7.

FIG. 8 is a side view of the rotary cylinder 13-2 showing a head arrangement. In FIG. 8, the entire periphery of the cylinder side is shown for convenience of explanation.

Figure 9:
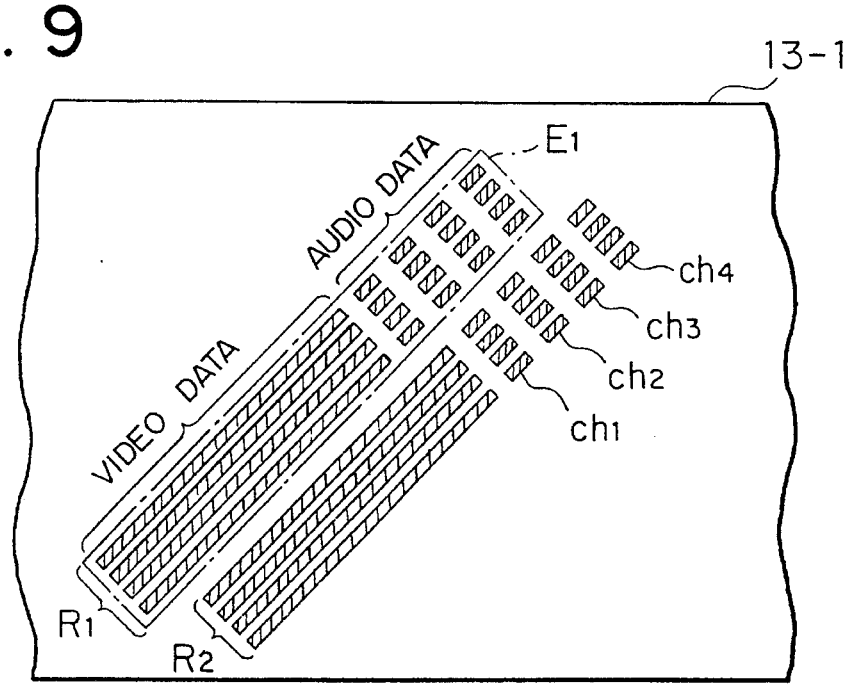
FIG. 9 is a diagram showing an example of a recording pattern formed by the tape head of FIG. 7.

An example of the recording pattern by the tape head system 13 of FIG. 7 is shown in FIG. 9. Audio signals can be recorded sequentially from channels 1 to 4 along the length of four video tracks. The area $E_1$ of erasure by the erasing head 130-8 covers $R_1$ and can be erased for four video tracks and four audio tracks at the same time. Since an edit gap (a portion lacking a recording signal) is inserted between audio channels, they can be edited independently of each other.

In similar fashion, the erasure area by the erasing head 13-9 is designated by $R_2$.

Instead of mounting recording heads separately from reproduction heads, a head having the dual functions of recording and reproduction may be used. Also, in place of processing signals by sync signal addition, eight-to-twelve modulation and timebase compression in that order in the recording system, a different order of processing may be employed with equal effect. The eight-to-twelve modulation, for example, may be effected after timebase compression.

Instead of the eight-channel recording which was shown as an example of recording a high-definition television signal, on the other hand, the present invention is, of course, applicable also to the recording of an ordinary television signal (e.g., NTSC signal) in the present television system. This embodiment is also applicable for any number of channels.

Now, explanation will be made about a reproduction system for reproducing a television signal from a recording medium recorded with data by the recording system. In the reproduction system, a reproduction head is mounted in the same cylinder as the recording head as shown in FIG. 7, so that the signal reproduced by the reproduction head is processed in the order reverse to the recording. Specifically, in FIG. 1, the serial-to-parallel conversion circuit 14 detects a sync signal for each block of the signal reproduced at the reproduction head, and synchronization is achieved for each word accordingly, thus converting the serial data of each word to a 12-bit parallel code. The data transfer speed of the 12-bit parallel code is increased by a factor of 1/a at a timebase expansion circuit 15. In other words, the timebase of the input data is expanded by a factor of 1/a. The 12-bit parallel code from the timebase expansion circuit 15 is converted into an eight-bit parallel code signal by a twelve-to-eight demodulation circuit 16. Further, a sync signal or a block address signal is separated from the output of the twelve-to-eight demodulation circuit 16 by a sync separation circuit 17 and is applied to an error correction circuit 18 and a distribution circuit 19. On the basis of code computation at vertical correction code additive circuits 4, 6 and a horizontal correction code additive circuit 8, the error correction circuit 18 corrects errors. The distribution circuit 19 prepares signals corresponding to the output signals of the A/D converters 1-1 to 1-3 and 2-1 to 2-8 of the recording system by the process reverse to the distribution circuit 3 and a segment-forming circuit 5 of the recording system, and these signals are applied to D/A converters 20-1 to 20-3, 21-1 to 21-8. As in the case of the recording system, the arrangement of the serial-to-parallel conversion circuit 14, the timebase expansion circuit 15 and the twelve-to-eight demodulation circuit 16 is not necessarily limited to that order shown in the embodiment of FIG. 1. Further, the reproduction system may alternatively be configured obviously by separating the reproduction system from the recording system with equal effect.

Although the eight-to-twelve modulation is used for n-to-m modulation in the embodiment described above, the four-to-six or eight-to-fourteen modulation may be employed to produce two or more successive bits of 1 or 0 in the signal waveform written on the tape with equal effect. In such a case, the m-to-n modulation system of the reproduction system is adapted for seven-to-one, six-to-four or fourteen-to-eight modulation.

Also, unlike in the aforementioned embodiment in which the head word of a sync signal is selected from group A since only one type of coincidence circuit is incorporated in the twelve-to-eight demodulation circuit, such selection may alternatively be any of groups B to D.

Also in the reproduction system, the time expansion and the twelve-to-eight demodulation may be effected in reverse order.

Figure 10:
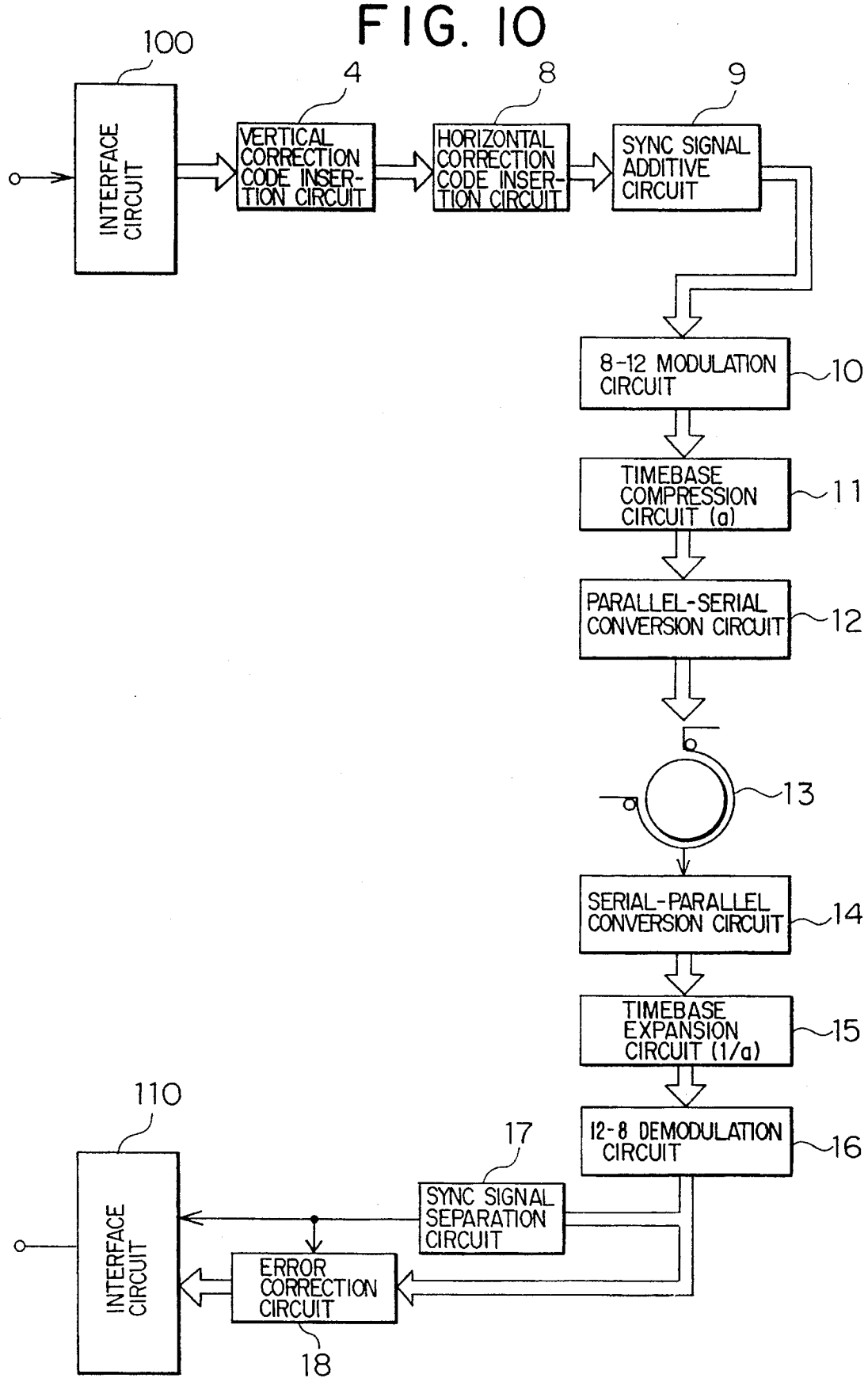
FIG. 10 is a block diagram showing a configuration of another example of a digital signal recording and reproduction apparatus according to the present invention.

Now, a second embodiment of the present invention will be explained with reference to FIG. 10. In FIG. 10, the component parts designated by the same reference numerals as in FIG. 1 have the same functions as those designated by the same reference numerals in FIG. 1 and will not be described again.

According to this embodiment, input data recorded include an image digital data and a high-speed (e.g.: 1 MHz or more) measurement data (e.g.: electric wave from space), etc. The input data is applied to an interface circuit 100 and, after being converted into a digital data and an eight-bit parallel digital data, is applied to a vertical correction code insertion circuit 4. Subsequent processes are similar to those in the aforementioned embodiment. In the reproduction system, a demodulated digital signal having an error corrected is converted into a signal corresponding to the input data of the recording system and produced as an output by the interface circuit 110.

Figure 11:
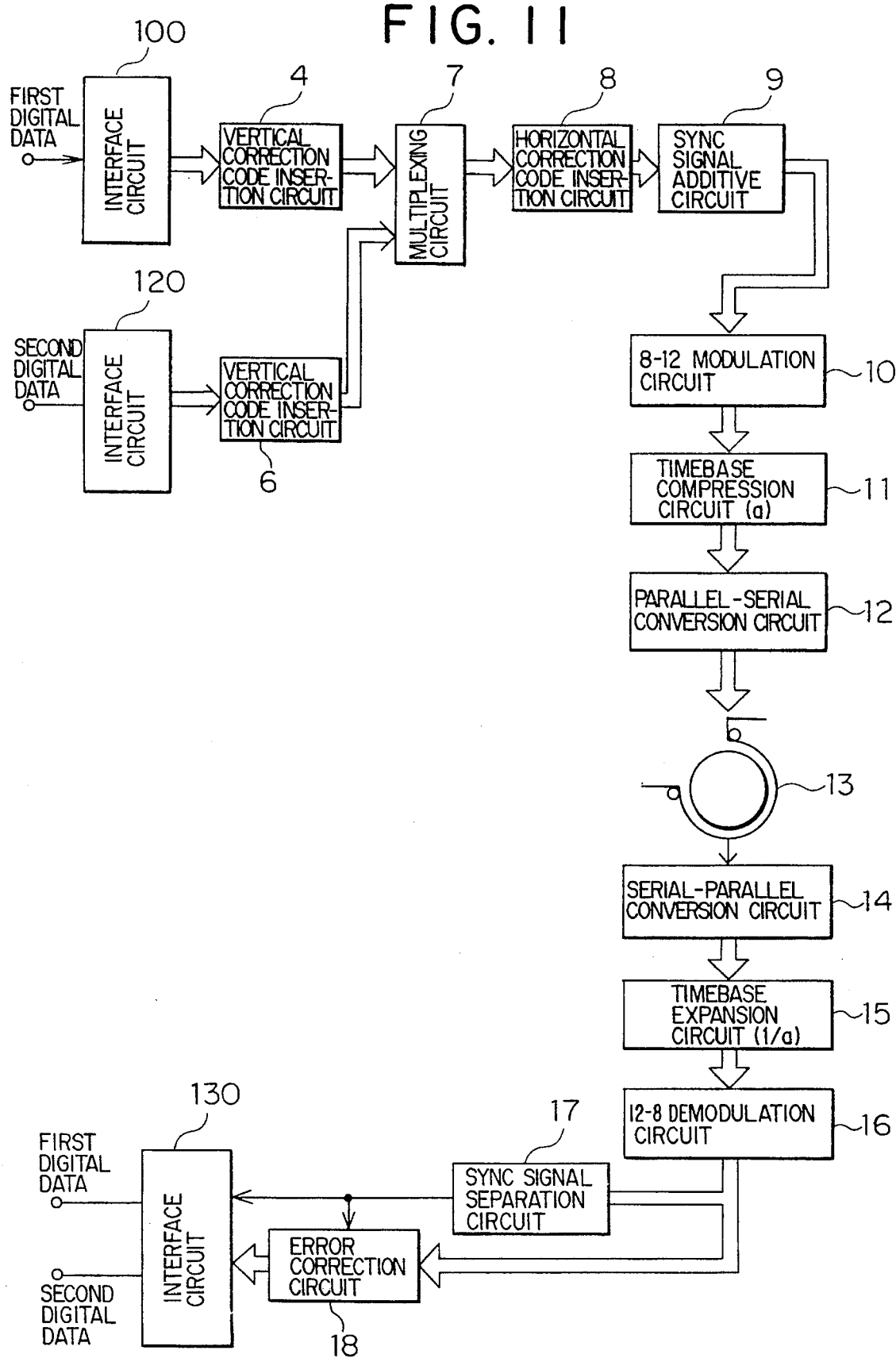
FIG. 11 is a block diagram showing a configuration of a modification of the example of FIG. 10.

FIG. 11 is a block diagram showing a modification of the second embodiment. This modification is intended to process the digital data for analyzing the contents of a second data, or an input data, for example, accompanying a first data applied to the interface 100. The digital data for analysis is applied to an interface circuit 120, and after being converted into an eight-bit parallel digital data, is applied to a vertical correction code insertion circuit 6. In this case, an interface circuit 130 of the reproduction system produces a data corresponding to the applied first and second data as an output. In the cases of FIGS. 10 and 11, a circuit other than the eight-to-twelve modulation circuit may be used as the conversion circuits 10, 16 in the first embodiment.

It will thus be understood from the foregoing description that according to the present invention there is realized an apparatus in which, assuming that the compression rate a is smaller than unity at an n-to-m modulation circuit, the winding angle is capable of being reduced, and therefore the size reduction is possible without changing the types of the magnetic heads and the magnetic tape. Also, a reduced winding angle improves the running performance of the tape and compatible reproduction.

Further, by always selecting the same modulation code regardless of the immediately-preceding modulation code word at least as a head code word of a sync code, there may be provided only one type of coincidence circuit for detecting a modulation code corresponding to the sync code from a reproduction code data, thereby contributing to a simplified circuit and a stable operation of the circuit. Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A digital signal recording apparatus for forming tracks sequentially on a recording medium by use of head means mounted on a rotary cylinder and recording digital data, which includes video data, in the tracks of said recording medium, said digital signal recording apparatus comprising:

code modulation means for modulating each of said digital data, including said video data, configured in units of n bits into code words, each code word being configured in units of m bits and having at least a high-level data bit string including at least p successive high-level data bits and a low-level data bit string including at least q successive low-level data bits in such a manner that the high-level data bit string and the low-level data bit string appear alternately, and said code words are configured in such a manner that a high-level data bit string of a plurality of successive high-level data bits and a low-level data bit string of a plurality of low-level data bits appear alternately in a signal waveform on the successive code words recorded in said recording medium, wherein n, m, p and q are all integers and n≧1; m>n; p>1; q>1; and m≧(p+q);

compression means for compressing a timebase of said code words of all of the digital data, including the video data, which are recorded in the tracks of said recording medium and producing a compressed code word as an output, wherein said timebase compression is performed at a compression rate of "a" satisfying the relationship m/nd≦a<1, wherein further "d" is a predetermined number and an integer of at least two; and means for recording said compressed code word output of said compression means in tracks of said recording medium.

2. A digital signal recording apparatus according to claim 1, wherein said code modulation means includes means for modulating digital data configured in units of n (n: an integer of at least one) bits into a code word in units of m (m: an integer larger than n) bits of high-level data bits and low-level data bits having at least d successive bits in a signal waveform recorded in said recording medium.

3. A digital signal recording apparatus according to claim 2, further comprising means for applying the digital data configured in units of n bits to said code modulation means on a block unit basis, wherein said modulation means includes means by which a first n bits of a sync code positioned at a head of each block of the digital data are converted into an m-bit code word not dependent on the value of an immediately-preceding m-bit code word.

4. A digital signal recording apparatus according to claim 1, wherein m, n and d are 12, 8 and 2 respectively, and said compression means includes means for compressing the timebase of said m-bit code word at a compression rate of "a" satisfying the relationship ¾<a<1.

5. A digital signal recording apparatus according to claim 1, wherein said digital data is a television signal including an audio signal having a plurality of channels and a video signal, and said recording means includes means for recording the video and audio signals being timebase compressed and alternately produced by said compression means in a same track on said recording medium in such a manner that said audio signals are divided into a plurality of channels in a same direction along said track.

6. A digital signal recording apparatus according to claim 1, wherein said recording means includes said head means for erasing digital data recorded in a plurality of tracks simultaneously.

7. A digital signal recording apparatus for forming tracks sequentially on a recording medium by use of head means mounted on a rotary cylinder and recording digital data, which includes video data, in the tracks of said recording medium said digital signal recording apparatus, comprising:

compression means for compressing a timebase of all of said digital data which are recorded in the tracks of said recording medium and producing compressed data as an output, wherein said timebase compression is performed at a compression rate of "a" satisfying the relationship m/nd≦a <1, wherein further "d" is a predetermined number and an integer of at least two;

code modulation means for modulating all of said digital data configured in units of n bits into code words, each code word being configured in units of m bits and having at least a high-level data bit string including at least p successive high-level data bits and a low-level data bit string including at least q successive low-level data bits in such a manner that the high-level data bit string and the low-level data bit string appear alternately, and said code words are configured in such a manner that a high-level data bit string of a plurality of successive high-level data bits and a low-level data bit string of a plurality of low-level data bits appear alternately in a signal waveform on the successive code words recorded in said recording medium, wherein n, m, p and q are all integers and n ≧1; m>n; p>1; q>1; and m≧(p+q); and means for recording said code word output of said code modulation means in the tracks of said recording medium by use of said head means.

8. A digital signal recording apparatus according to claim 7, wherein said compression means includes means for compressing and producing as an output a timebase of digital data configured in units of n bits (n: an integer of at least one), and said code modulation means includes means for modulating said compressed digital data into said code word in units of m (m: an integer larger than n) bits having at least d successive high-level and low-level data bits in a waveform recorded in said recording medium.

9. A digital signal recording and/or reproduction apparatus for forming tracks sequentially in a recording medium by use of head means mounted on a rotary cylinder, recording input digital data, which includes video data, in the tracks of said recording medium and reproducing said recorded digital data, said apparatus comprising:

code modulation means for modulating all of said digital data configured in units of n bits into code words, each code word being configured in units of m bits and having at least a high-level data bit string including at least p successive high-level data bits and a low-level data bit string including at least q successive low-level data bits in such a manner that the high-level data bit string and the low-level data bit string appear alternately, and said code words are configured in such a manner that a high-level data bit string of a plurality of successive high-level data bits and a low-level data bit string of a plurality of low-level data bits appear alternately in a signal waveform on the successive code words recorded in said recording medium, wherein n, m, p and q are all integers and n≧1; m>n; p>1; q>1; and m≧(p+q);

compression means for compressing a timebase of said code words of all of the digital data which are recorded in the tracks of said recording medium and producing a compressed code word as an output word;

wherein said timebase compression is performed at a compression rate of "a" satisfying the relationship m/nd≦a<1, wherein further "d" is a predetermined number and an integer of at least two;

means for recording said compressed code word produced from said compression means in the tracks of said recording medium by use of said head means;

reproduction means for reproducing said compressed code word recorded in said recording medium;

expansion means for expanding said timebase of said code word reproduced by said reproduction means; and demodulation means for demodulating said expanded code word into said input digital data.

10. A digital signal recording and/or reproduction apparatus according to claim 9, wherein said compression means includes means for compressing said timebase of said code words at the compression rate of "a" and said expansion means includes means for expanding the timebase of said reproduced code word at an expansion rate of 1/a.

11. A digital signal recording and/or reproduction apparatus according to claim 9, wherein said code modulation means includes means for modulating digital data configured in units of n (n: an integer of at least one) bits into the code word in m bits (m: an integer larger than n) having at least d successive high-level and low-level data bits in a signal waveform recorded in said recording medium; and said demodulation means includes means for demodulating said code word in timebase expanded units of m bits into digital data configured in units of n bits.

12. A digital signal recording and/or reproduction apparatus for forming tracks sequentially on a recording medium by use of head means mounted on a rotary cylinder, recording input digital data, which includes video data, in the tracks of said recording medium and reproducing said recorded digital data, said apparatus comprising:

compression means for compressing a timebase of said input digital data and producing said compressed data as an output, wherein said timebase compression is performed at a compression rate of "a" satisfying the relationship m/nd≦a<1, wherein further "d" is a predetermined number and an integer of at least two;

code modulation means for modulating each of said digital data configured in units of n bits into code words, each code word being configured in units of m bits and having at least a high-level data bit string including at least p successive high-level data bits and a low-level data bit string including at least q successive low-level data bits in such a manner that the high-level data bit string and the low-level data bit string appear alternately, and said code words are configured in such a manner that a high-level data bit string of a plurality of successive high-level data bits and a low-level data bit string of a plurality of low-level data bits appear alternately in a signal waveform on the successive code words recorded in said recording medium, wherein n, m, p and q are all integers and n≧1; m>n; p>1; q>1; and m≧(p+q);

means for recording said code word output from said code modulation means in the tracks of said recording medium by use of said head means;

reproduction means for reproducing the expanded code words recorded in said recording medium;

expansion means for expanding a timebase of said code words of all digital data which are recorded in the tracks of said recording medium reproduced by said reproduction means; and demodulation means for reproducing said input digital data from said expanded code words.

13. A digital signal recording and/or reproduction apparatus according to claim 12, wherein said compression means includes means for compressing the timebase of said input digital data at the compression rate of "a"; and said expansion means includes means for expanding the timebase of said reproduced code word at an expansion rate of 1/a.

14. A digital signal recording and/or reproduction apparatus according to claim 12, wherein said compression means includes means for compressing and producing as an output the timebase of digital data configured in units of n (n: an integer of at least one) bits;

said code modulation means includes means for modulating said compressed digital data into said code word in units of m (m: an integer larger than n) bits having high-level and low-level data of at least d successive bits in a signal waveform recorded in said recording medium; and said demodulation means includes means for demodulating said code word in units of m bits with an expanded timebase into digital data configured in units of n bits.

15. A digital signal reproduction apparatus for forming tracks sequentially on a recording medium by use of head means mounted on a rotary cylinder and reproducing digital data, which includes video data, recorded in the tracks of said recording medium, said digital signal reproduction apparatus comprising:

reproduction means for reproducing code words, each code word being configured in units of m bits and having at least a high-level data bit string including at least p successive high-level data bits and a low-level data bit string including at least q successive low-level data bits in such a manner that the high-level data bit string and the low-level data bit string appear alternately, and said code words are configured in such a manner that a high-level data bit string of a plurality of successive high-level data bits and a low-level data bit string of a plurality of low-level data bits appear alternately in a signal waveform on the successive code words recorded in said recording medium, wherein n, m, p and q are all integers and n n≧1; m>n; p>1; q>1; and m≧(p+q);

expansion means for expanding a timebase of said code words of all digital data which are recorded in the tracks of said recording medium reproduced by said reproduction means, wherein said timebase expansion is performed at an expansion rate of 1/a satisfying the relationship m/nd≦a≦1, wherein d is a predetermined integer of 2 or more; and means for demodulating said expanded code words into said digital data.

16. A digital signal reproduction apparatus according to claim 15, wherein said demodulation means includes means for demodulating said code word in timebase expanded units of m (m: an integer larger than n) bits into said digital data configured in unite of n (n: an integer of at least one) bits.

17. A digital signal reproduction apparatus for forming tracks sequentially on a recording medium by use of head means mounted on a rotary cylinder and reproducing digital data, which includes video data, recorded in the tracks of said recording medium, said digital signal reproduction apparatus comprising:

reproduction means for reproducing code words, each code word being configured in units of m bits and having at least a high-level data bit string including at least p successive high-level data bits and a low-level data bit string including at least q successive low-level data bits in such a manner that the high-level data bit string and the low-level data bit string appear alternately, and said code words are configured in such a manner that a high-level data bit string of a plurality of successive high-level data bits and a low-level data bit string of a plurality of low-level data bits appear alternately in a signal waveform on the successive code words recorded in said recording medium, wherein n, m, p and q are all integers and n n≧1; m>n; p>1; q>1; and m≧(p+q);

demodulation means for demodulating said code words reproduced by said reproduction means into said digital data; and expansion means for expanding a timebase of said demodulated digital data, wherein said timebase expansion is performed at an expansion rate of 1/a satisfying the relationship m/nd≦a≦1, wherein d is a predetermined integer of 2 or more.

18. A digital signal reproduction apparatus according to claim 17, wherein said demodulation means includes means for demodulating said reproduced code word in units of m (m: an integer larger than n) bits into digital data configured in units of n (n: an integer of at least one) bits.

19. A method of digital signal recording for forming tracks sequentially on a recording medium by use of head means mounted on rotary cylinder and recording digital data, which includes a video data, in the tracks of said recording medium, said method comprising the steps of:

modulating all of said digital data configured in units of n bits into code words, each code word being configured in units of m bits and having at least a high-level data bit string including at least p successive high-level data bits and a low-level data bit string including at least q successive low-level data bits in such a manner that the high-level data bit string and the low-level data bit string appear alternately, and said code words are configured in such a manner that a high-level data bit string of a plurality of successive high-level data bits and a low-level data bit string of a plurality of low-level data bits appear alternately in a signal waveform on the successive code words recorded in said recording medium, wherein n, m, p and q are all integers and n≧1; m>n; p>1; q>1; and m≧(p+q);

compressing a timebase of said code words of all digital data which are recorded in the tracks of said recording medium, wherein said timebase compression is performed at a compression rate of "a" satisfying the relationship m/nd≦a<1, wherein further "d" is a predetermined number and an integer of at least two; and recording said compressed code words in the tracks of said recording medium by use of said head means.

20. A method of digital signal recording according to claim 19, wherein said code modulating step includes modulating said digital data configured in units of n (n: an integer of at least one) bits into the code word in units of m (m: an integer larger than n) bits having at least d successive high-level and low-level data bits in a signal waveform recorded in said recording medium.

21. A method of digital signal recording according to claim 20 said method further comprising a step of outputting said digital data configured in units of n bits, wherein said modulating step includes a step of modulating a first n bits of a sync signal located at a head of each block of said digital data into an m-bit code word not dependent on a value of an immediately-preceding m-bit code word.

22. A method of digital signal recording according to claim 19, wherein m, n and d are 12, 8 and 2 respectively, and said compressing step includes compressing said timebase of said m-bit code word at a compression rate of "a" satisfying the relationship ¾≦a<1.

23. A method of digital signal recording according to claim 19, wherein said digital data is a television signal including a video signal and an audio signal having a plurality of channels, and said recording step includes recording timebase-compressed video and audio signals from said compressing step in a same track of said recording medium in such a manner that said audio signal is divided into a plurality of channels in a same direction along said track.

24. A method of digital signal recording according to claim 19, wherein said recording step includes erasing said digital data recorded in a plurality of tracks by an erasing head unit capable of simultaneous erasure.

25. A method of digital signal reproduction for forming tracks sequentially on a recording medium by use of head means mounted on a rotary cylinder and reproducing digital data, which includes video data, recorded in the tracks of said recording medium, said method comprising the steps of:

reproducing code words, each code word being configured in units of m bits and having at least a high-level data bit string including at least p successive high-level data bits and a low-level data bit string including at least q successive low-level data bits in such a manner that the high-level data bit string and the low-level data bit string appear alternately, and said code words are configured in such a manner that a high-level data bit string of a plurality of successive high-level data bits and a low-level data bit string of a plurality of low-level data bits appear alternately in a signal waveform on the successive code words recorded in said recording medium, wherein n, m, p and q are all integers and n≧1; m>n; p>1; q>1; and m≧(p+q);

demodulating said reproduced code words into said digital data; and expanding a timebase of said demodulated digital data, wherein said timebase expansion is performed at an expansion rate of 1/a satisfying the relationship m/nd≦a≦1, wherein d is a predetermined integer of 2 or more.

26. A method of digital signal reproduction according to claim 25, wherein said demodulating step includes demodulating said reproduced code word in units of m (m: an integer larger than n) bits into a digital data configured in units of n (n: an integer of at least one) bits.

27. A method of digital signal recording for forming tracks sequentially in a recording medium by use of head means mounted on a rotary cylinder and recording digital data, which includes video data in the tracks of said recording medium said method, comprising the steps of:

compressing a timebase of all of said digital data which are recorded in the tracks of said recording medium, wherein said timebase compression is performed at a compression rate of "a" satisfying the relationship m/nd≦a<1, wherein further "d" is a predetermined number and an integer of at least two;

modulating each of said digital data configured in units of n bits into code words, each code word being configured in units of m bits and having at least a high-level data bit string including at least p successive high-level data bits and a low-level data bit string including at least q successive low-level data bits in such a manner that the high-level data bit string and the low-level data bit string appear alternately, and said code words are configured in such a manner that a high-level data bit string of a plurality of successive high-level data bits and a low-level data bit string of a plurality of low-level data bits appear alternately in a signal waveform on the successive code words recorded in said recording medium, wherein n, m, p and q are all integers and n≧1; m>n; p>1; q>1; and m≧(p+q); and recording said code words subjected to code modulation in the tracks of said recording medium by use of said head means.

28. A method of digital signal recording according to claim 27, wherein said compressing step includes compressing said timebase of said digital data configured in units of n (n: an integer of at least one) bits; and said code modulating step includes modulating said compressed digital data into said code word in units of m (m: an integer larger than n) bits having at least d successive high-level and low-level data bits in a signal waveform recorded in said recording medium.

29. A method of digital signal recording and/or reproduction for forming tracks sequentially on a recording medium by use of head means mounted on a rotary cylinder, recording input digital data, which includes video data, in the tracks of said recording medium and reproducing said recorded digital data, said method comprising the steps of:

modulating each of said digital data configured in units of n bits into code words, each code word being configured in units of m bits and having at least a high-level data bit string including at least p successive high-level data bits and a low-level data bit string including at least q successive low-level data bits in such a manner that the high-level data bit string and the low-level data bit string appear alternately, and said code words are configured in such a manner that a high-level data bit string of a plurality of successive high-level data bits and a low-level data bit string of a plurality of low-level data bits appear alternately in a signal waveform on the successive code words recorded in said recording medium, wherein n, m, p and q are all integers and n≧1; m>n; p>1; q>1; and m≧(p+q);

compressing a timebase of said code words of all digital data which are recorded in the tracks of said recording medium and producing a compressed word output, wherein said timebase compression is performed at a compression rate of "a" satisfying the relationship m/nd≦a<1, wherein further "d" is a predetermined number and an integer of at least two;

recording said compressed code word in the tracks of said recording medium by use of said head means;

reproducing said code word compressed and recorded in said recording medium;

expanding said timebase of said reproduced code word; and demodulating said expanded code word into said input digital data.

30. A method of digital signal recording and/or reproduction according to claim 29, wherein said compressing step includes compressing said timebase of said code word at a compression rate of "a"; and said expanding step includes expanding a timebase of said reproduced code word at an expansion rate of 1/a.

31. A method of digital signal recording and/or reproduction according to claim 30, wherein said code modulating step includes modulating said digital data configured in units of n (n: an integer of at least one) bits into said code word in units of m (m: an integer larger than n) bits having at least d successive high-level and low-level data bits in a signal waveform recorded in said recording medium; and said demodulating step includes demodulating said code word in units of m bits with an expanded timebase into said digital data configured in units of n bits.

32. A method of digital signal recording and/or reproduction for forming tracks sequentially on a recording medium by use of head means mounted on a rotary cylinder, recording input digital data, which includes video data, in the tracks of said recording medium and reproducing said digital data thus recorded, said method comprising the steps of:

compressing a timebase of all of said input digital data which are recorded in the tracks of said recording medium, wherein said timebase compression is performed at a compression rate of "a" satisfying the relationship m/nd≦a<1, wherein further "d" is predetermined number and an integer of at least two;

modulating each of said digital data configured in units of n bits into code words, each code word being configured in units of m bits and having at least a high-level data bit string including at least p successive high-level data bits and a low-level data bit string including at least q successive low-level data bits in such a manner that the high-level data bit string and the low-level data bit string appear alternately, and said code words are configured in such a manner that a high-level data bit string of a plurality of successive high-level data bits and a low-level data bit string of a plurality of low-level data bits appear alternately in a signal waveform on the successive code words recorded in said recording medium, wherein n, m, p and q are all integers and $n \geq 1$; $m > n$; $p > 1$; $q > 1$; and $m \geq (p+q)$;

recording said code words in the tracks of said recording medium by use of said head means;

reproducing said code words recorded and compressed in said recording medium;

expanding a timebase of said code words reproduced; and demodulating said expanded code words into said input digital data.

33. A method of digital signal recording and/or reproduction according to claim 32, wherein said compressing step includes compressing the timebase of said digital data at the compression rate of "a"; and said expanding step includes expanding said timebase of said reproduced code word at an expansion rate of 1/a.

34. A method of digital signal recording and/or reproduction according to claim 32, wherein said compressing step includes compressing the timebase of said digital data configured in units of n (n: an integer of at least one) bits;

said code modulating step includes modulating compressed digital data into the code word in units of m (m: an integer larger than n) bits having at least d successive high-level level and low-level data bits in a signal waveform recorded in said recording medium; and said demodulating step includes demodulating said timebase-expanded code word in units of m bits into said digital data configured in units of n bits.

35. A method of digital signal reproduction for forming tracks sequentially on a recording medium by use of head means mounted on a rotary cylinder, said method comprising the steps of:

reproducing code words, each code word being configured in units of m bits and having at least a high-level data bit string including at least p successive high-level data bits and a low-level data bit string including at least q successive low-level data bits in such a manner that the high-level data bit string and the low-level data bit string appear alternately, and said code words are configured in such a manner that a high-level data bit string of a plurality of successive high-level data bits and a low-level data bit string of a plurality of low-level data bits appear alternately in a signal waveform on the successive code words recorded in said recording medium, wherein n, m, p and q are all integers and $n \geq 1$; $m > n$; $p > 1$; $q > 1$; and $m \geq (p+q)$;

expanding a timebase of said reproduced code words of all digital data, which includes video data, and which are recorded in the tracks of said recording medium, wherein said timebase expansion is performed at an expansion rate of 1/a satisfying the relationship $m/nd \leq a \leq 1$, wherein d is a predetermined integer of 2 or more; and demodulating said expanded code words into said digital data.

36. A method of digital signal reproduction according to claim 35, wherein said demodulating step includes demodulating said timebase-expanded code word in units of m (m: an integer larger than n) bits into the digital data configured in units of n (n: an integer of at least one) bits.

* * * * *